United States Patent
Fan

(10) Patent No.: US 12,189,428 B2
(45) Date of Patent: Jan. 7, 2025

(54) FOLDABLE DISPLAY DEVICE AND ELECTRONIC APPARATUS

(71) Applicant: Wuhan China Star Optoelectronics Semiconductor Display Technology Co., Ltd., Wuhan (CN)

(72) Inventor: Yu Fan, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/785,449

(22) PCT Filed: May 31, 2022

(86) PCT No.: PCT/CN2022/096407
§ 371 (c)(1),
(2) Date: Jun. 15, 2022

(87) PCT Pub. No.: WO2023/221174
PCT Pub. Date: Nov. 23, 2023

(65) Prior Publication Data
US 2024/0192727 A1    Jun. 13, 2024

(30) Foreign Application Priority Data
May 19, 2022   (CN) .......................... 202210555250.6

(51) Int. Cl.
*G06F 1/16*    (2006.01)
(52) U.S. Cl.
CPC ................................. *G06F 1/1652* (2013.01)
(58) Field of Classification Search
CPC ..... G06F 1/1652; G06F 1/1637; G06F 1/1616
See application file for complete search history.

(56) References Cited

U.S. PATENT DOCUMENTS 10,520,992 B1    12/2019   Chang et al.
2021/0150944 A1*   5/2021   Yoon ..................... G06F 1/1618

FOREIGN PATENT DOCUMENTS

| CN | 206332719 U | 7/2017 |
| CN | 108989502 A | 12/2018 |

(Continued)

OTHER PUBLICATIONS

International Search Report in International application No. PCT/CN2022/096407, mailed on Dec. 20, 2022.

(Continued)

*Primary Examiner* — James Wu
*Assistant Examiner* — Dakota M Talbert
(74) *Attorney, Agent, or Firm* — Nathan & Associates; Menachem Nathan

(57) ABSTRACT

The present disclosure provides a foldable display device and an electronic apparatus, wherein a protection layer as an outermost layer of a flexible display screen is connected to an ornamental member, and an activity space is reserved between the ornamental member and inner side surfaces of a frame. As such, when the flexible display screen is folded, side edges of the protection layer may be shifted forward with respect to a display module, and then the ornamental member may approach the frame in a direction in which the protection layer is shifted, so that the ornamental member may conceal the dislocation occurring when the flexible display screen is folded, along with the protection layer, so as to improve the user's look-and-feel.

12 Claims, 6 Drawing Sheets

(56) References Cited

FOREIGN PATENT DOCUMENTS

| | | | | |
|---|---|---|---|---|
| CN | 209765931 | U | * | 12/2019 |
| CN | 210671188 | U | * | 6/2020 |
| CN | 111986572 | A | | 11/2020 |
| CN | 112509465 | A | * | 3/2021 |
| CN | 113014702 | A | | 6/2021 |
| CN | 213484915 | U | | 6/2021 |
| CN | 215867631 | U | | 2/2022 |
| WO | 2021042998 | A1 | | 3/2021 |

OTHER PUBLICATIONS

Written Opinion of the International Search Authority in International application No. PCT/CN2022/096407, mailed on Dec. 20, 2022.

Chinese Office Action issued in corresponding Chinese Patent Application No. 202210555250.6 dated Apr. 20, 2023, pp. 1-8.

* cited by examiner

FOLDABLE DISPLAY DEVICE AND ELECTRONIC APPARATUS

TECHNICAL FIELD

The present disclosure belongs to a display technical field, and in particular, relates to a foldable display device and an electronic apparatus.

BACKGROUND

With the development of the flexible display technology, flexible display screens are increasingly applied in electronic apparatus, especially in foldable electronic apparatus. There is also a growing demand for the feel and appearance of the foldable electronic apparatus. For example, the foldable electronic apparatus is expected to have a flat and smooth display surface. In practice, however, when the flexible display screen is folded, as shown in FIG. 1, dislocation occurs between different film layers due to the thickness accumulation and the different bending radius.

Technical Problems

In the related art, side edges of film layers of the display screen are concealed by providing a front frame, to conceal the dislocation in folded state. However, the front frame can protrude from the surface of the screen, which affects the look-and-feel and the grip effect of the electronic apparatus.

Technical Solutions

Embodiments of the present disclosure provide a touch display panel and a touch display device to improve a mura phenomenon appearing on the touch display panel after a reliability test.

According to a first aspect, an embodiment of the present disclosure provides a foldable display device, including:
- a flexible display screen including a display module, a protection layer disposed on a front surface of the display module, and a support layer disposed on a back surface of the display module, wherein the display module further has a side surface connected between the front surface and the back surface thereof;
- a housing including a bottom housing and a frame disposed at a top of the bottom housing, wherein the frame extends along borders of the bottom housing, the flexible display screen is mounted on the housing and is located in an area surrounded by the frame, and the support layer is connected to the bottom housing; and
- an ornamental member disposed between the frame and the flexible display screen, wherein an activity space is formed between the ornamental member and an inner side surface of the frame, the display module is located on a side of the ornamental member away from the activity space, the side surface of the display module are covered by the ornamental member, and an side edge of the protection layer are connected to the ornamental member, and wherein the ornamental member approaches the inner side surface of the frame along with the side edge of the protection layer during a folding process of the flexible display screen, the ornamental member moves away from the inner side surface of the frame along with the side edge of the protection layer during an unfolding process of the flexible display screen, wherein in a direction perpendicular to the flexible display screen, the ornamental member and the frame do not protrude from a surface of the protection layer away from the bottom housing.

According to a second aspect, an embodiment of the present disclosure provides an electronic apparatus, the electronic apparatus including a controller, a drive circuit and a foldable display device, wherein the controller is connected to the drive circuit, and the drive circuit is connected to the foldable display device, wherein the foldable display device includes:
- a flexible display screen including a display module, a protection layer disposed on a front surface of the display module, and a support layer disposed on a back surface of the display module, wherein the display module further has a side surface connected between the front surface and the back surface thereof;
- a housing including a bottom housing and a frame disposed at a top of the bottom housing, wherein the frame extends along borders of the bottom housing, the flexible display screen is mounted on the housing and is located in an area surrounded by the frame, and the support layer is connected to the bottom housing; and
- an ornamental member disposed between the frame and the flexible display screen, wherein an activity space is formed between the ornamental member and an inner side surface of the frame, the display module is located on a side of the ornamental member away from the activity space, the side surface of the display module are covered by the ornamental member, and an side edge of the protection layer are connected to the ornamental member, and wherein the ornamental member approaches the inner side surface of the frame along with the side edge of the protection layer during a folding process of the flexible display screen, the ornamental member moves away from the inner side surface of the frame along with the side edge of the protection layer during an unfolding process of the flexible display screen, and wherein in a direction perpendicular to the flexible display screen, the ornamental member and the frame do not protrude from a surface of the protection layer away from the bottom housing.

Beneficial Effects

According to a foldable display device according to an embodiment of the present disclosure, a protection layer as an outermost layer of a flexible display screen is connected to an ornamental member, and an activity space is reserved between the ornamental member and inner side surfaces of a frame. As such, when the flexible display screen is folded, side edges of the protection layer may be shifted forward with respect to a display module, and then the ornamental member may approach the frame in a direction in which the protection layer is shifted, so that the ornamental member may conceal the dislocation occurring when the flexible display screen is folded along with the protection layer, so as to improve the user's look-and-feel. That is, in the foldable display device according to an embodiment of the present disclosure, a reserved space and a concealing structure are provided for a folding dislocation of the flexible display screen without a front frame, as so to avoiding the front frame shielding side edges of a front screen of the flexible display screen. Therefore, a screen surface of the foldable display device may become more flat and smooth, and the look-and-feel and the grip effect of the foldable display device may be improved. In addition, the screen ratio of the foldable display device may be increased.

100 foldable display device; 10 flexible display screen; 11 display module; 12 protection layer; 13 support layer; 20 housing; 21 bottom housing; 22 frame; 30 ornamental member; 40 activity space; 31 support portion; 32 lap-jointed portion; 33 limiting portion; 211 protuberance; 50 limiting space; 331 first projection; 332 second projection; 221 abutting inclined surface; 34 lap-jointed inclined surface; 50 adhesive layer.

EMBODIMENTS OF THE PRESENT DISCLOSURE

Technical solutions in embodiments of the present disclosure will be clearly and completely described below in conjunction with the accompanying drawings in the embodiments of the present disclosure. It will be apparent that the described embodiments are only some but not all of the embodiments of the present disclosure. Based on the embodiments of the present disclosure, all other embodiments obtained by a person skilled in the art without creative efforts are within the scope of the present disclosure.

An embodiment of the present disclosure provides a foldable display device 100 and an electronic apparatus, to solve the problem that the current foldable display device 100 has the poor look-and-feel and the poor grip feel. The display device may be any product or component having a display function, such as an electronic paper, a mobile phone, a tablet computer, a television, a display, a notebook computer, a digital photo frame, a navigation device, or the like. The following description will be made with reference to the accompanying drawings.

Figure 3:
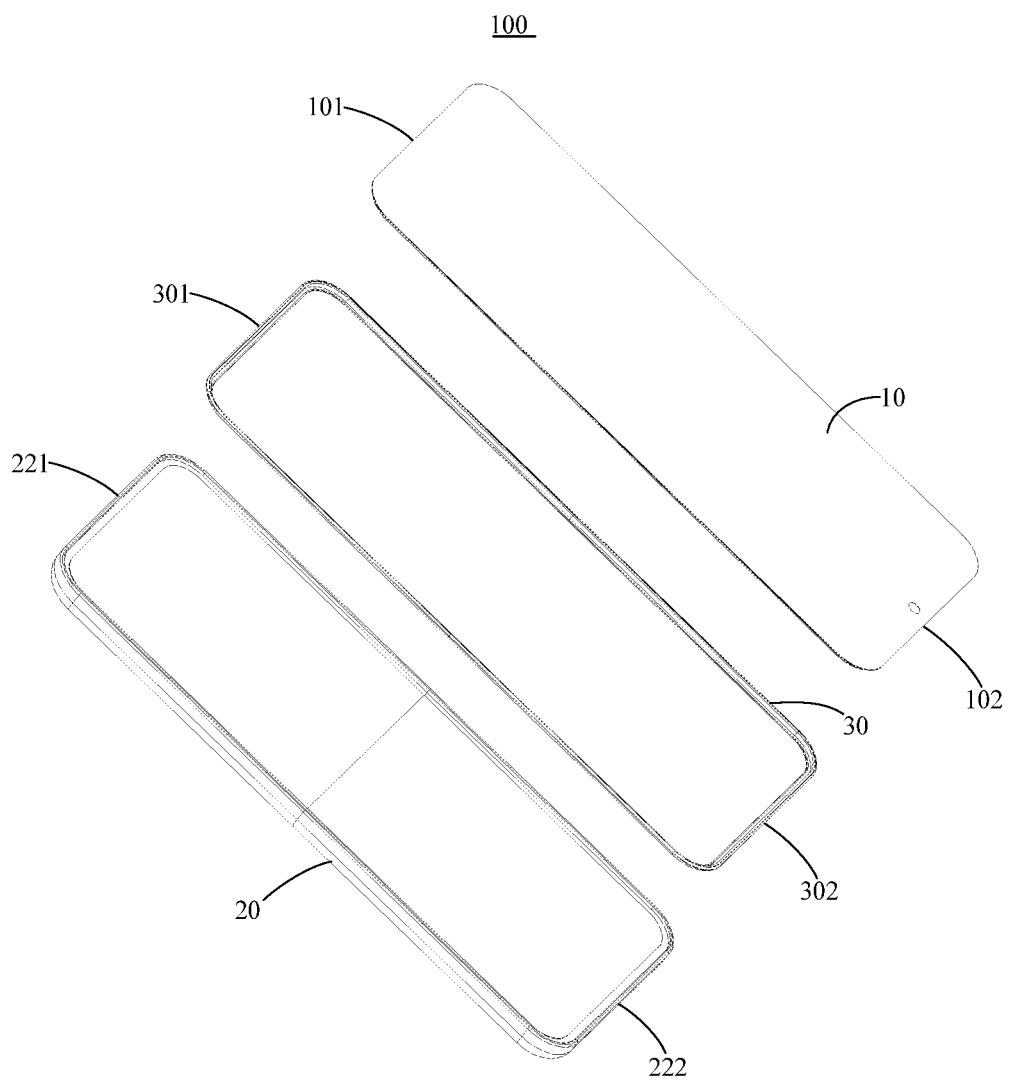
FIG. 3 is an exploded schematic view of a foldable display device according to an embodiment of the present disclosure.
Figure 4:
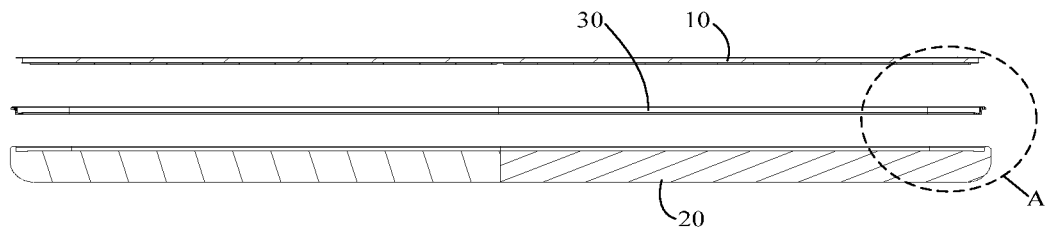
FIG. 4 is an exploded cross-sectional schematic view of a foldable display device according to an embodiment of the present disclosure.
Figure 5:
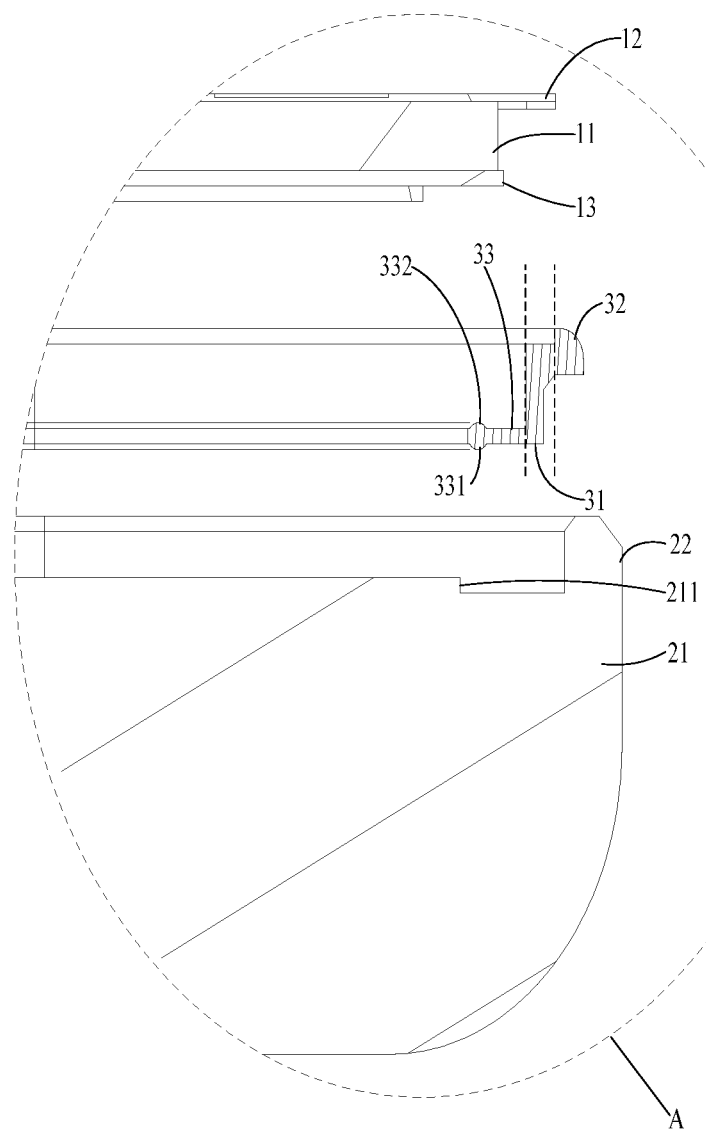
FIG. 5 is a partially enlarged view of portion A in FIG. 4.

Referring to FIGS. 2 to 5, FIG. 2 is a structural schematic view of a foldable display device according to an embodiment of the present disclosure. FIG. 3 is an exploded schematic view of a foldable display device according to an embodiment of the present disclosure. FIG. 4 is an exploded cross-sectional schematic view of a foldable display device according to an embodiment of the present disclosure. FIG. 5 is a partially enlarged view of portion A in FIG. 4.

The foldable display device 100 according to an embodiment of the present disclosure may be applied in an electronic apparatus. The foldable display device 100 includes a flexible display screen 10, a housing 20, and an ornamental member 30. The flexible display screen 10 includes a display module 11, a protection layer 12 disposed on a front surface of the display module 11, and a support layer 13 disposed on a back surface of the display module 11. The display module 11 further has side surfaces 111 connected between the front surface and the back surface thereof. The housing 20 includes a bottom housing 21 and a frame 22 disposed on a top of the bottom housing 21. The frame 22 extends along borders of the bottom housing 21. The flexible display screen 10 is mounted on the housing 20 and is located in an area surrounded by the frame 22. The support layer 13 is connected to the bottom housing 21. The ornamental member 30 is disposed between the frame 22 and the flexible display screen 10. An activity space 40 is formed between the ornamental member 30 and inner side surfaces of the frame 22. The display module 11 is located on a side of the ornamental member 30 away from the activity space 40. The side surfaces 111 of the display module 11 are covered by the ornamental member 30. Side edges of the protection layer 12 are connected to the ornamental member 30, and the ornamental member 30 approaches the inner side surfaces of the frame 22 along with the side edges of the protection layer 12 during a folding process of the flexible display screen 10. The ornamental member 30 moves away from the inner side surfaces of the frame 22 along with the side edges of the protection layer 12 during an unfolding process of the flexible display screen 10. In a direction perpendicular to the flexible display screen 10, the ornamental member 30 and the frame 22 do not protrude from a surface of the protection layer 12 away from the bottom housing 21.

Figure 1:
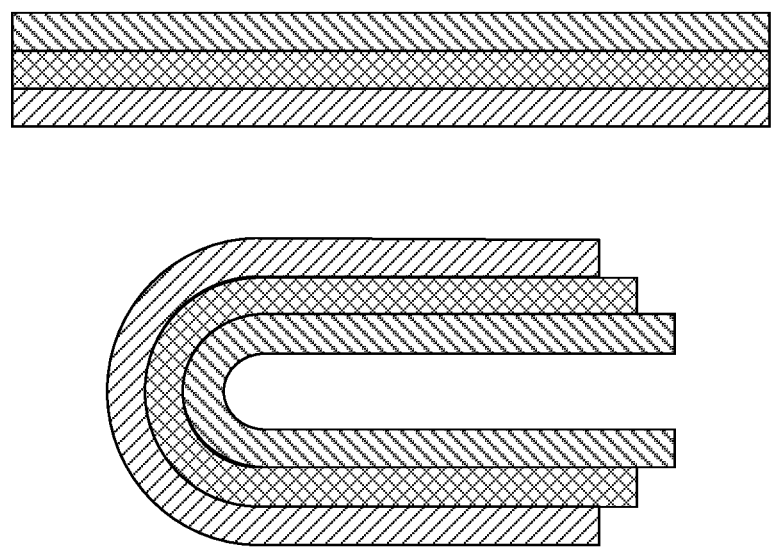
FIG. 1 is a schematic cross-sectional view of a foldable display screen in related art.
Figure 2:
FIG. 2 is a structural schematic view of a foldable display device according to an embodiment of the present disclosure.

In this embodiment, the display module 11 may be an OLED display module 11, or may be an QLED display module 11 or an LCD display module 11. The display module 11 is not limited herein, as long as it is a flexible display module 11. The front surface of the display module 11 is a light-exiting surface, that is, a screen of the display device visible to the user. The back surface of the display module 11 is a surface opposite to the light-exiting surface. The support layer 13 may be disposed as a metal support layer, for example, a stainless steel layer, for supporting the display module 11. The protection layer 12 may be a transparent film layer, for example, a PET (polyethylene terephthalate) layer, a PE (polyethylene) layer, or a PMMA (polymethyl methacrylate) layer. The protection layer 12 is configured to protect the display module 11 from damage or scratching. When the flexible display screen 10 is folded, it is folded from the back surface toward the front surface. Due to the different thickness accumulations and the different bending radius, the side edges of the protection layer 12 may be outwardly shifted with respect to the display module 11, and side edges of the support layer 13 may be inwardly shifted with respect to the display module 11, which results in a dislocation of the flexible display screen 10 in the folded state, as shown in FIG. 1.

The housing 20 includes a first housing and a second housing (not shown) rotatably connected to each other. Each of the first housing and the second housing includes the bottom housing 21 and the frame 22. The flexible display screen 10 is mounted in the housing 20. The flexible display screen 10 may be folded by rotating the first housing and the second housing toward each other. In contrast, the flexible display screen 10 may be unfolded by rotating the first housing and the second housing away from each other.

Figure 9:
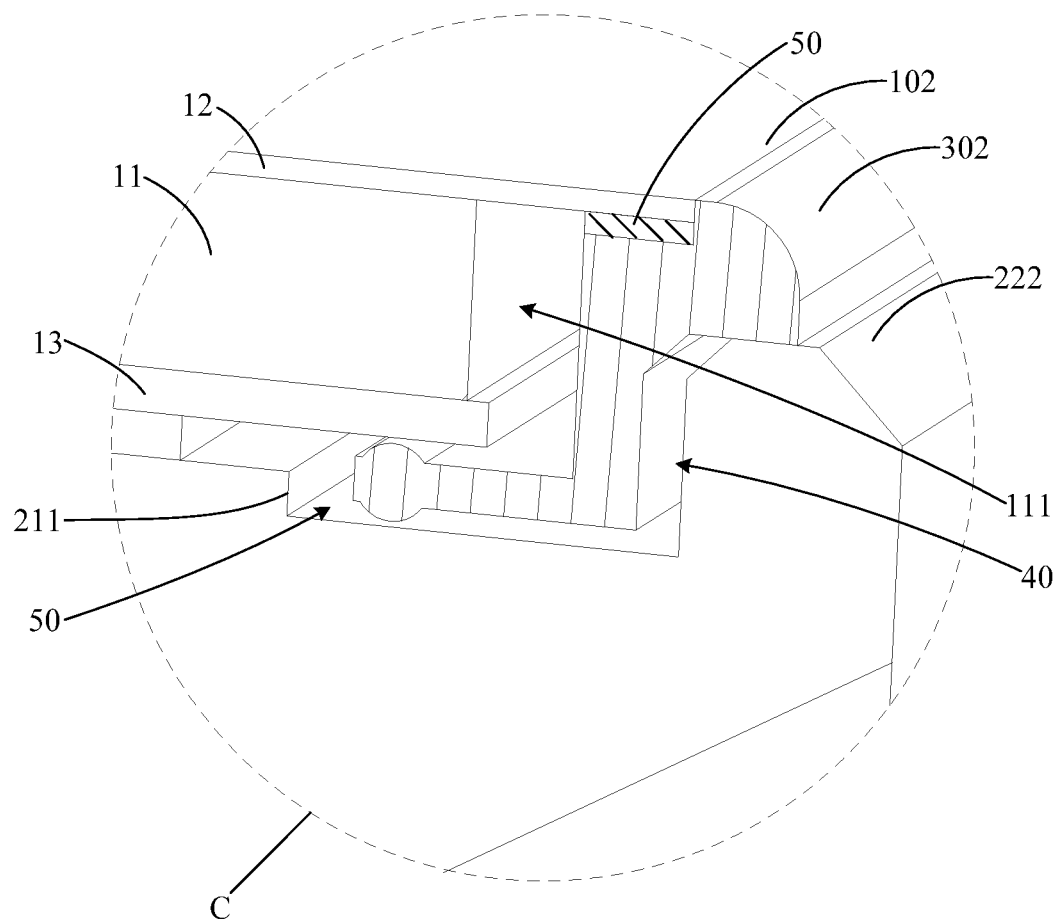
FIG. 9 is a partially enlarged view of portion C in FIG. 8.

As shown in FIGS. 3 and 9, the flexible display screen 10 includes a first display edge 101 and a second display edge 102 disposed opposite to each other. The first display edge 101 and the second display edge 102 may approach each other as the flexible display screen 10 is folded, or may move away from each other as the flexible display screen 10 is unfolded. The frame 22 includes a first frame edge 221 adjacent the first display edge 101 and a second frame edge 222 adjacent the second display edge 102. The ornamental member 30 includes a first ornamental member edge 301 between the first display edge 101 and the first frame edge 221 and a second ornamental member edge 302 between the second display edge 102 and the second frame edge 222. The side edges of the protection layer 12 at the first display edge 101 and the second display edge 102 is connected to the first ornamental edge 301 and the second ornamental edge 302, respectively. The first ornamental edge 301 and the second ornamental edge 302 may be movable with respect to the first frame edge 221 and the second frame edge 222, respectively.

Figure 6:
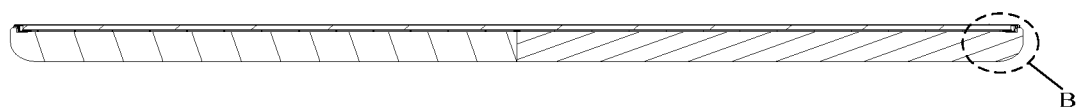
FIG. 6 is a schematic cross-sectional view of a foldable display device according to an embodiment of the present disclosure.
Figure 7:
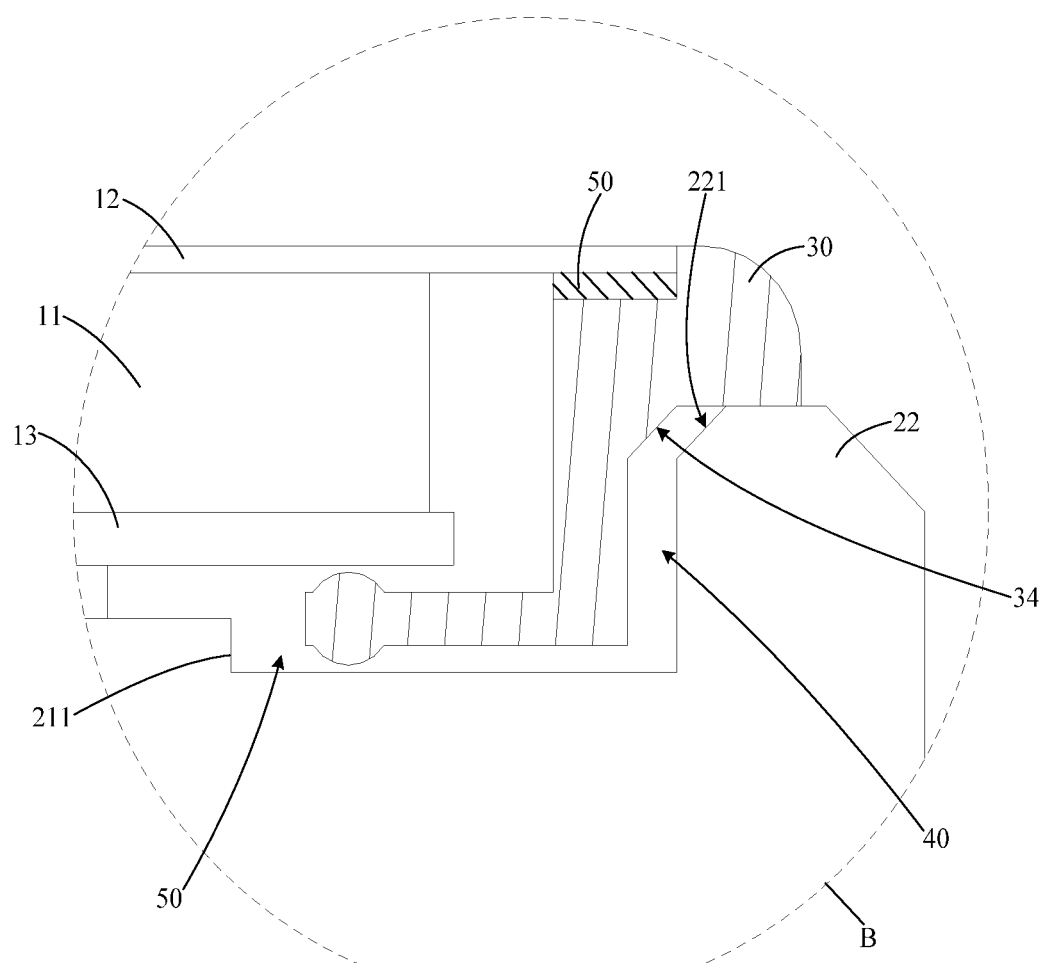
FIG. 7 is a partially enlarged view of portion B in FIG. 6.

Please refer to FIG. 6 and FIG. 7 together. FIG. 6 is a schematic cross-sectional view of a foldable display device according to an embodiment of the present disclosure. FIG. 7 is a partially enlarged view of portion B in FIG. 6.

When the flexible display screen 10 is folded, the side edges of the protection layer 12 are outwardly shifted with respect to the first display edge 101 and the second display edge 102 due to the dislocation, thereby bringing the first ornamental edge 301 and the second ornamental edge 302 approach the first frame edge 221 and the second frame edge 222. When the flexible display screen 10 is unfolded, the side edges of the protection layer 12 are reset, thereby bringing the first ornamental edge 301 and the second ornamental edge 302 to be reset. At least the side surface 111 of the display module 11 at the first display edge 101 is covered by the first ornamental edge 301, and at least the side surface 111 of the display module 11 at the second display edge 102 is covered by the second ornamental edge 302. Therefore, the dislocation occurring when the first display edge 101 and the second display edge 102 are folded may be effectively conceal by the first ornamental edge 301 and the second ornamental edge 302.

In the unfolded state of the flexible display screen 10, the support layer 13 is bond and fixed to the bottom housing 21 by a backing adhesive. Therefore, both the display module 11 and the protection layer 12 are fixed with respect to the housing 20, and thus the ornamental member 30 connected to the protection layer 12 is also fixed with respect to the housing 20, and no problem that the ornamental member 30 shakes with respect to the housing 20 will do not arise. Only when the protection layer 12 is folded, the ornamental members 30 may move with the offsets of the side edges of the protection layer 12.

The connection between the protection layer 12 and the ornamental member 30 may be a movable connection, or may be a fixed connection. It should be noted that the ornamental member 30 may cover only the side surfaces 111 of the display module 11, or may cover both the side surfaces 111 of the display module 11 and the side edges of the protection layer 12. In the case that the ornamental member 30 covers only the side surfaces 111 of the display module 11, although the side edges of the protection layer 12 are not covered, the dislocation between the protection layer 12 and the display module 11 is effectively concealed.

Neither the ornamental member 30 nor the frame 22 protrudes from the protection layer 12 in a thickness direction of the display device, thereby avoiding the edges of the screen front surface of the flexible display screen 10 from being covered or coated. Therefore, the flatness and smoothness of the screen of the display device are ensured, and the look-and-feel and the grip effect of the foldable display device 100 are effectively improved. Further, since the side edges of the protection layer 12 are not covered by the ornamental members 30 or the frame 22, the screen ratio of the foldable display device 100 may be effectively increased. In addition, the front frame is also omitted in the foldable display device 100 according to the present embodiment. Therefore, an internal structure of the foldable display device 100 may be simplified, to improve the processing production efficiency and to reduce the processing production cost.

For example, as shown in FIGS. 5 and 7, the ornamental member 30 includes a support portion 31 and a lap-jointed portion 32. The activity space 40 is formed between the support portion 31 and the inner side surfaces of the frame 22. The protection layer 12 is connected to one end of the support portion 31 away from the bottom housing 21. The lap-jointed portion 32 is connected to the one end of the support portion 31 away from the bottom housing 21, and is lap-jointed with an end surface of the frame 22 away from the bottom housing 21.

In this embodiment, the support portion 31 extends in the thickness direction of the flexible display screen 10. The support portion 31 is movably abutted against the bottom housing 21, and the other end of the support portion 31 is connected to the side edges of the protection layer 12. The activity space 40 is formed between the support portion 31 and the frame 22. The lap-jointed portion 32 is connected to a side of the support portion 31 away from the flexible display screen 10. The lap-jointed portion 32 is lap-jointed with an top end of the frame 22. That is, the lap-jointed portion 32 is located above the activity space 40, so that the activity space 40 may be concealed and hidden to achieve the dust-proof and water-releasing effect. The protection layer 12 may be connected to an top end surface of the support portion 31, and may also be connected to side surfaces of the support portion 31 away from the frame 22, which is not limited herein. It should be noted that the surfaces of both the support portion 31 and the lap-jointed portion 32 are not protruded from the protection layer 12, so that the screen surface of the foldable display device 100 is ensured to be flat.

For example, as shown in FIGS. 5 and 7, the side edges of the protection layer 12 protrudes from side edges of the display module 11 and are connected to the end surface of the support portion 31. The surface of the protection layer 12 is flushed with and smoothly transits from a surface of the lap-jointed portion 32. The protection layer 12 and the support portion 31 may be bonded and fixed by the adhesive layer 50. The protection layer 12 is connected to the end surface of the support portion 31, and the connection area between the protection layer 12 and the support portion 31 may be increased, thereby improving the connection strength. The surface of the lap-jointed portion 32 protrudes from the end surface of the supporting portion 31 and is flush with the protection layer 12, thereby making screen edges of the foldable display device 100 smoother. The surface of the lap-jointed portion 32 may be disposed as a convex arc surface, to further improve the look-and-feel and the grip effect of the display device at the corners thereof.

Since the protection layer 12 is flexible and has a smaller thickness, the limiting effect on the ornamental member 30 in the thickness direction is weak. If the ornamental member 30 is not effectively limited, it is easy to lift up or out of the bottom housing 21 in the thickness direction. Thus, a structure for limiting the ornamental member 30 may be disposed on the housing 20. For example, a sliding fit may be achieved between the lap-jointed portion 32 and the frame 22 by a limiting structure, to maintain the lap-jointed relationship between the lap-jointed portion 32 and the frame 22.

Figure 8:
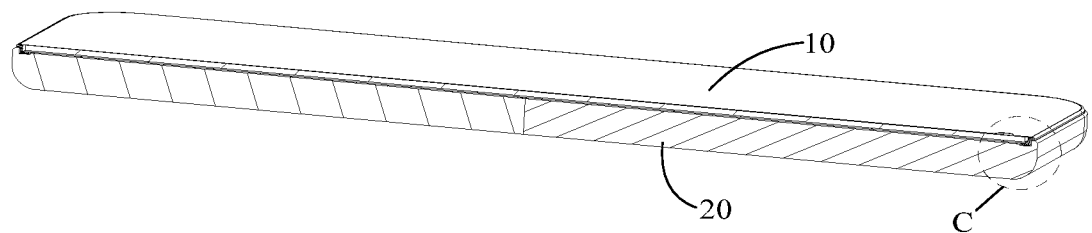
FIG. 8 is a schematic cross-sectional view of a foldable display device according to another embodiment of the present disclosure.

Please refer to FIG. 8 and FIG. 9 together. FIG. 8 is a schematic cross-sectional view of a foldable display device according to another embodiment of the present disclosure. FIG. 9 is a partially enlarged view of portion C in FIG. 8.

For example, the ornamental member 30 further includes a limiting portion 33 connected to one end of the support portion 31 close to the bottom housing 21. A limiting space 50 is formed between the side edges of the support layer 13 and the bottom housing 21, and one end of the limiting portion 33 extends to the limiting space 50.

The bottom housing 21 may be disposed with a protuberance 211 for supporting a middle portion of the support layer 13. The side edges of the support layer 13 protrude from the side edges of the protuberance 11, so that the limiting space 50 is formed between the side edges of the support layer 13 and the bottom housing 21. The support layer 13 and the protuberance 211 may be bond and fixed by a backing adhesive. The limiting portion 33 extends in a direction parallel to the flexible display screen 10. One end of the limiting portion 33 is connected to a bottom end of the support portion 31, and the other end of the limiting portion 33 extends into the limiting space 50, so that the limiting portion 33 may be effectively limited between the flexible display screen 10 and the bottom housing 21 in the thickness direction. In this way, the flexible display screen 10 may be configured to limit the ornamental member 30, thereby preventing the ornamental member 30 from being detached from the housing 20 and preventing the lap-jointed portion 32 from being warped to expose the activity space 40. Since the support layer 13 is a stainless steel layer, even when subjected to a force from the limiting part, the support layer 13 may be not easily deformed or damaged, thereby ensuring structural stability of the display module 11.

The limiting portion 33 is sandwiched between the support layer 13 and the bottom housing 21. During the folding and unfolding processes of the foldable display device 100, the limiting portion 33 needs to be moved integrally with the ornamental member 30. Therefore, the limiting portion 33 can be rubbed against at least one of the support layer 13 and the bottom housing 21. The friction can cause resistance to the movements of the limiting portion 33 and the ornamental member 30, and thus the folding and unfolding processes of the foldable display device 100 are hindered.

For example, as shown in FIGS. 5, 7 and 9, in order to reduce the influence of the limiting portion 33 on the folding and unfolding processes of the foldable display device 100, a first protrusion 331 is disposed at one end of the limiting portion 33 in the limiting space 50. The first protrusion 331 abuts against the bottom housing 21. The first protrusion 331, instead of the limiting portion 33, may be slidably abutted against the bottom housing 21, so as to reduce a contact friction area of the ornamental member 30 as a whole with the bottom housing 21. Therefore, the resistance caused by the friction may be reduced, so as to make the folding and unfolding processes of the foldable display device 100 become smoother. A surface of the first protrusion 331 is a convex arc surface, and the contact surface between the first protrusion 331 and the bottom housing 21 may be disposed to be a convex arc surface, so that a contact friction force between the first protrusion 331 and the bottom housing 21 may be further reduced.

Similarly, a second projection 332 is disposed at the one end of the limiting portion 33 in the limiting space 50. The second protrusion 332 abuts against the support layer 13. The second protrusion 332, instead of the stop portion 33, may be slidably abutted against the support layer 13, to reduce the contact friction area of the ornamental member 30 as a whole with the support layer 13. Therefore, the resistance caused by the friction may be reduced, so as to make the folding and unfolding processes of the foldable display device 100 become smoother. A surface of the second protrusion 332 is a convex arc surface, and the contact surface between the second protrusion 332 and the support layer 13 may be disposed to be a convex arc surface, so that a contact friction force between the second protrusion 332 and the support layer 13 may be further reduced.

During the folding process of the foldable display device 100, the support portion 31 may approach the inner side surface of the frame 22, but the lap-jointed portion 32 may be hindered by sharp corners between the inner side surfaces of the frame 22. Accordingly, for example, as shown in FIGS. 5 and 7, an abutting inclined surface 221 is formed at one end of the inner side surface of the frame 22 close to the lap-jointed portion 32. An lap-jointed inclined surface 34 corresponding to the abutting inclined surface 221 is formed at a connection portion between the support portion 31 and the lap-jointed portion 32. By the abutting inclined surface 221, it is possible to reduce the hindrance to movable approach between the lap-jointed portion 32 and the support portion 31 due to the sharp corners of the frame 22, thereby improving the movement smoothness of the ornament member 30. The contact area between the ornamental member 30 and the frame 22 when the ornamental member 30 is adjacent to the frame 22 may be increased by the lap-jointed inclined surface 34, which stabilizes the contact state of the ornamental member 30 with the frame 22.

For example, the width of the activity space 40 is set in a range from 0.04 mm to 0.06 mm, specifically, 0.05 mm, to increase the effective utilization for the internal space in the housing 20 meanwhile ensuring the dislocation distance for the protection layer 12. The foldable display device 100 further includes an elastic resetting member disposed at the activity space 40 and configured for resetting the ornamental member 30 to a position away from the inner side surface of the frame 22. The elastic resetting member may be disposed as a spring, or may be disposed as an elastic layer, such as a silicone layer or a sponge layer. When the foldable display device 100 is folded, the elastic resetting member may be compressed as the ornamental member 30 approaches to the frame 22, so that an elastic potential energy is generated in the elastic resetting member. When the foldable display device 100 is unfolding, the ornamental member 30 gradually moves away from the frame 22, and the elastic potential energy in the elastic resetting member is released, thereby resetting the ornamental member 30 to the position away from the frame 22. In this way, during the unfolding process of the foldable display device 100, it is not necessary to reset the ornamental member 30 by means of the contraction of the protection layer 12, to reduce the force acting on the protection layer 12, thereby improving the structural stability of the protection layer 12.

For example, embodiments of the present disclosure further provide an electronic apparatus including a controller, a drive circuit, and a foldable display device 100 as described above. The controller is connected to the drive circuit, and the drive circuit is connected to the foldable display device 100.

In the foldable display device 100 according to an embodiment of the present disclosure, a protection layer 12 as an outermost layer of a flexible display screen 10 is connected to an ornamental member 30, and an activity space 40 is reserved between the ornamental member 30 and inner side surfaces of a frame 22. As such, when the flexible display screen 10 is folded, side edges of the protection layer 12 may be shifted forward with respect to a display module 11, and then the ornamental member 30 may approach the frame 22 in a direction in which the protection layer 12 is shifted, so that the ornamental member 30 may conceal the dislocation occurring when the flexible display screen 10 is folded along with the protection layer 12, so as to improve the user's look-and-feel. That is, in the foldable display device 100 according to an embodiment of the present disclosure, a reserved space and a concealing structure are provided for a folding dislocation of the flexible display screen 10 without a front frame, as so to avoiding the front frame shielding side edges of a front screen of the flexible display screen 10. Therefore, the screen surface of the foldable display device 100 may become more flat and smooth, and the look-and-feel and the grip effect of the foldable display device 100 may be improved. In addition, the screen ratio of the foldable display device 100 may be increased.

In the above-described embodiments, the description of each embodiment has its own emphasis. For a part not described in detail in some embodiments, reference may be made to the related description of other embodiments.

In descriptions of the present disclosure, the terms "first" and "second" are used for descriptive purposes only, and cannot be understood as indicating or implying relative importance or implicitly indicating the number of the indicated technical features. Thus, the features defined with "first" and "second" may explicitly or implicitly include one or more features.

The flexible display device according to embodiments of the present disclosure is described in detail above. The principles and implementations of the present disclosure are described herein by employing specific examples. The description of the above embodiments is only used to help understand the method and core idea of the present disclosure. Meanwhile, for those skilled in the art, according to the idea of the present disclosure, there will be some changes in specific embodiments and application scope. In conclusion, the contents of the present specification shall not be construed as limiting the present disclosure.

What is claimed is:

1. A foldable display device comprising:
    a flexible display screen comprising a display module, a protection layer disposed on a front surface of the display module, and a support layer disposed on a back surface of the display module, wherein the display module further has a side surface connected between the front surface and the back surface thereof;
    a housing comprising a bottom housing and a frame disposed at a top of the bottom housing, wherein the frame extends along borders of the bottom housing, the flexible display screen is mounted on the housing and is located in an area surrounded by the frame, and the support layer is connected to the bottom housing; and
    an ornamental member disposed between the frame and the flexible display screen and being a member that is at least partially seen by a user, wherein an activity space is formed between the ornamental member and an inner side surface of the frame; the display module is located on a side of the ornamental member away from the activity space, the side surface of the display module are covered by the ornamental member; and an side edge of the protection layer are connected to the ornamental member, wherein the ornamental member approaches the inner side surface of the frame along with the side edge of the protection layer during a folding process of the flexible display screen; the ornamental member moves away from the inner side surface of the frame along with the side edge of the protection layer during an unfolding process of the flexible display screen;
    wherein in a direction perpendicular to the flexible display screen, the ornamental member and the frame do not protrude from a surface of the protection layer away from the bottom housing,
    wherein the ornamental member comprises a support portion and a lap-jointed portion, the activity space is formed between the support portion and the inner side surface of the frame, and the protection layer is connected to one end of the support portion away from the bottom housing, and wherein the lap-jointed portion is connected to the one end of the support portion away from the bottom housing, and is lap-jointed with an end surface of the frame away from the bottom housing,
    wherein the ornamental member further comprises a limiting portion connected to one end of the support portion close to the bottom housing, and wherein a limiting space is formed between a side edge of the support layer and the bottom housing, and one end of the limiting portion extends to the limiting space, and
    wherein a first protrusion or a second protrusion is disposed at one end of the limiting portion in the limiting space, and a surface of each of the first protrusion and the second protrusion is a convex arc surface, and the first protrusion and the second protrusion abuts against the bottom housing and the support layer, respectively.

2. The foldable display device according to claim 1, wherein the side edge of the protection layer protrudes from a side edge of the display module and is connected to an end surface of the support portion, and wherein the surface of the protection layer is flushed with and smoothly transits from a surface of the lap-jointed portion.

3. The foldable display device according to claim 1, wherein an abutting inclined surface is formed at one end of the inner side surface of the frame close to the lap-jointed portion, and a lap-jointed inclined surface corresponding to the abutting inclined surface is formed at a connection portion between the support portion and the lap-jointed portion.

4. The foldable display device according to claim 1, wherein a width of the activity space is set as in a range from 0.04 mm to 0.06 mm.

5. The foldable display device according to claim 1, wherein the foldable display device further comprises an elastic resetting member disposed at the activity space, and the elastic resetting member is configured for resetting the ornamental member to a position away from the inner side surface of the frame.

6. The foldable display device according to claim 1, wherein the support layer is a metal support layer; and/or the protection layer is a PET (polyethylene terephthalate) layer, a PE (polyethylene) layer, or a PMMA (polymethyl methacrylate) layer.

7. An electronic apparatus comprising a controller, a drive circuit and a foldable display device, wherein the controller is connected to the drive circuit, and the drive circuit is connected to the foldable display device,
    wherein the foldable display device comprises:
    a flexible display screen comprising a display module, a protection layer disposed on a front surface of the display module, and a support layer disposed on a back surface of the display module; wherein the display module further has a side surface connected between the front surface and the back surface thereof;
- a housing comprising a bottom housing and a frame disposed at a top of the bottom housing, wherein the frame extends along borders of the bottom housing; the flexible display screen is mounted on the housing and is located in an area surrounded by the frame, and the support layer is connected to the bottom housing; and
- an ornamental member disposed between the frame and the flexible display screen and being a member that is at least partially seen by a user, wherein an activity space is formed between the ornamental member and an inner side surface of the frame; the display module is located on a side of the ornamental member away from the activity space, the side surface of the display module are covered by the ornamental member; and an side edge of the protection layer are connected to the ornamental member, wherein the ornamental member approaches the inner side surface of the frame along with the side edge of the protection layer during a folding process of the flexible display screen, the ornamental member moves away from the inner side surface of the frame along with the side edge of the protection layer during an unfolding process of the flexible display screen, and
- wherein in a direction perpendicular to the flexible display screen, the ornamental member and the frame do not protrude from a surface of the protection layer away from the bottom housing,
- wherein the ornamental member comprises a support portion and a lap-jointed portion, the activity space is formed between the support portion and the inner side surface of the frame, and the protection layer is connected to one end of the support portion away from the bottom housing, and wherein the lap-jointed portion is connected to the one end of the support portion away from the bottom housing, and is lap-jointed with an end surface of the frame away from the bottom housing,
- wherein the ornamental member further comprises a limiting portion connected to one end of the support portion close to the bottom housing, and wherein a limiting space is formed between a side edge of the support layer and the bottom housing, and one end of the limiting portion extends to the limiting space, and
- wherein a first protrusion or a second protrusion is disposed at one end of the limiting portion in the limiting space, and a surface of each of the first protrusion and the second protrusion is a convex arc surface, and the first protrusion and the second protrusion abuts against the bottom housing and the support layer, respectively.

8. The electronic apparatus according to claim 7, wherein the side edge of the protection layer protrudes from a side edge of the display module and is connected to an end surface of the support portion, and wherein the surface of the protection layer is flushed with and smoothly transits from a surface of the lap-jointed portion.

9. The electronic apparatus according to claim 7, wherein an abutting inclined surface is formed at one end of the inner side surface of the frame close to the lap-jointed portion, and a lap-jointed inclined surface corresponding to the abutting inclined surface is formed at a connection portion between the support portion and the lap-jointed portion.

10. The electronic apparatus according to claim 7, wherein a width of the activity space is set as in a range from 0.04 mm to 0.06 mm.

11. The electronic apparatus according to claim 7, wherein the foldable display device further comprises an elastic resetting member disposed at the activity space, and the elastic resetting member is configured for resetting the ornamental member to a position away from the inner side surface of the frame.

12. The electronic apparatus according to claim 7, wherein the support layer is a metal support layer; and/or the protection layer is a PET (polyethylene terephthalate) layer, a PE (polyethylene) layer, or a PMMA (polymethyl methacrylate) layer.

* * * * *